UNITED STATES PATENT OFFICE.

R. B. BAYARD, OF PHILADELPHIA, PENNSYLVANIA.

IMPROVED ARTIFICIAL FUEL.

Specification forming part of Letters Patent No. 48,506, dated July 4, 1865.

*To all whom it may concern:*

Be it known that I, R. B. BAYARD, of the city of Philadelphia, county of Philadelphia, and State of Pennsylvania, have invented a new and useful Petroleum Fuel; and I do hereby declare that the following is such a full, clear, and exact description thereof as will enable others skilled in the art to make and use the same.

My invention consists in the combination or aggregation of the substance known as "petroleum" with suitable combustible mineral and fibrous substances united or cemented together by means of suitable resinous or earthy substances, and compressed by machinery adapted to the purpose into cubes or lumps of any desirable size, so as to form a new and improved fuel, as will be hereinafter described.

I mix together petroleum and sawdust in the proportions of about one part of the former to eight parts of the latter, or so as to completely saturate and enrich the sawdust and render it exceedingly combustible. To this mixture I add about sixteen parts of coal-dust, and then bind or cement the whole together with plaster-of-paris, clay, or a resinous substance or substances, which will unite the above ingredients and solidify the mass when subjected to pressure in suitable molds.

The petroleum or "rock oil" which I use is that substance obtained from oil-wells or other natural sources, and this substance may be used either in its crude or refined state.

The vegetable substance which I prefer to use may be prepared from any kind of wood or vegetable fiber, ground or sawed, or reduced in any suitable manner to a proper degree of fineness to freely absorb the petroleum and become thoroughly saturated or impregnated with it. The mineral substance which I prefer employing is coal-dust, or the screenings from anthracite or bituminous coal, or pulverized cinders. These circumstances, when combined in about the proportions above mentioned, are then mixed with tar, pitch, rosin, plaster-of-paris, lime, hydraulic cement, or any other one or more of these or other cementing substances which will bind the above-mentioned combustible substances together and enable me to compress the whole mass into a compact and portable form suitable for burning. When properly mixed, the saturated fibrous vegetable substance and the coal-dust will be interspersed throughout the entire mass, so that a rapid and complete ignition of the fuel will take place while burning it.

Having thus described my petroleum fuel, what I claim as new, and desire to secure by Letters Patent, is—

The combination of petroleum or rock oil with vegetable fiber and coal-dust, in about the proportions herein specified.

R. B. BAYARD.

Witnesses:
PERCIVAL ROBERTS,
THOMAS FERGUSON.